W. W. HILLS.
REIN HOLDER FOR ATTACHMENT TO VEHICLES.
APPLICATION FILED MAY 4, 1909.
929,592.
Patented July 27, 1909.
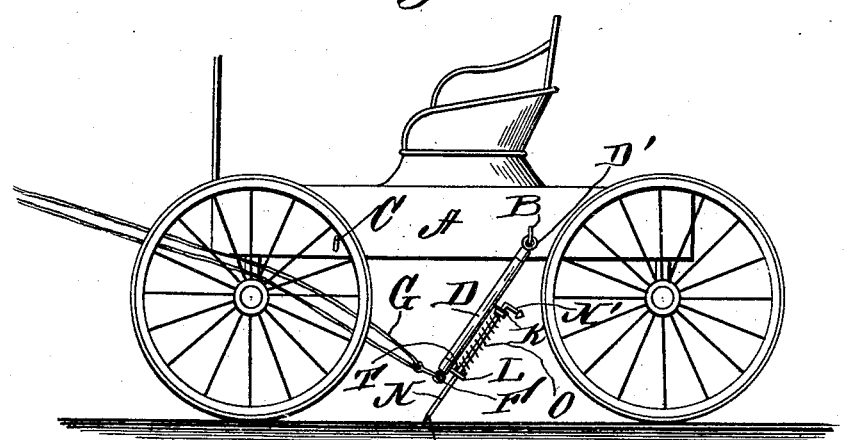
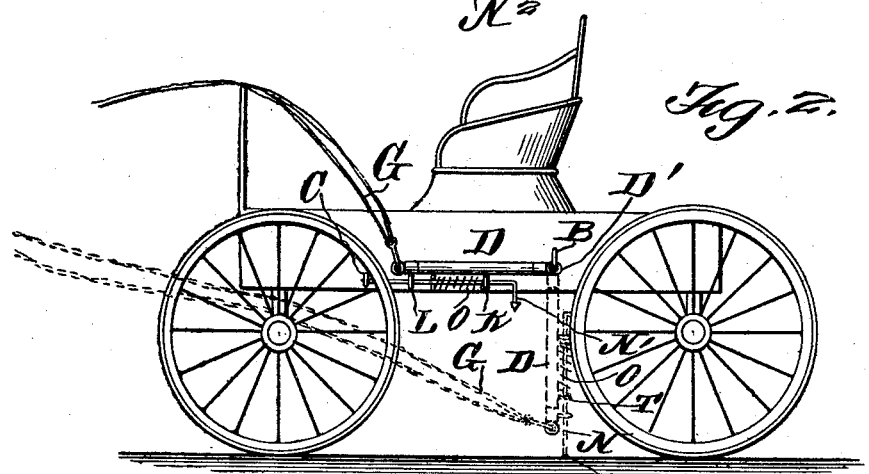
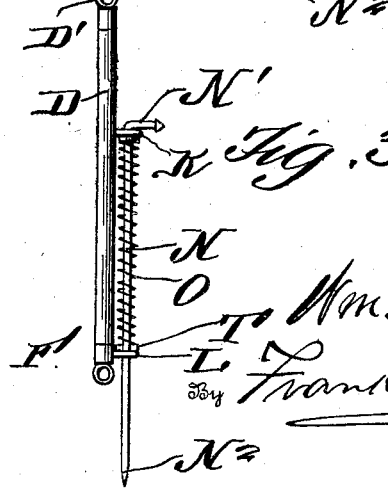

UNITED STATES PATENT OFFICE.

WILLIAM W. HILLS, OF KALKASKA, MICHIGAN.

REIN-HOLDER FOR ATTACHMENT TO VEHICLES.

No. 929,592.　　　　Specification of Letters Patent.　　Patented July 27, 1909.

Application filed May 4, 1909.　Serial No. 493,982.

*To all whom it may concern:*

Be it known that I, WILLIAM W. HILLS, a citizen of the United States, residing at Kalkaska, in the county of Kalkaska and State of Michigan, have invented certain new and useful Improvements in Rein-Holders for Attachment to Vehicles; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in rein holding devices for attachment to buggies, sleighs, etc., and affords simple and efficient means for checking a horse as it starts to move the vehicle.

The invention comprises various details of construction, combinations and arrangements of parts which will be hereinafter fully described and then specifically defined in the appended claim.

My invention is illustrated in the accompanying drawings, in which:—

Figure 1 is a side elevation of my apparatus shown as applied to a buggy sill and engaging the ground, and Fig. 2 is a similar view showing the device held out of engagement with the ground. Fig. 3 is an enlarged detail view of the device detached from the buggy.

Reference now being had to the details of the drawings by letter, A designates the box of a vehicle having two eyes, designated by letters B and C respectively, fastened to the side thereof.

D is a bar having an eye D' at one end engaging the eye B and an eye F at its other end to which the reins G are adapted to be fastened in any suitable manner. Said bar D has two eyes K and L fastened thereto, and N is a rod passing through the eyes K and L and having one end angled as at N' and its other end N² pointed. A spring O is interposed between the eye K and a pin T fastened to the rod, the office of said spring being to throw the rod N at its farthest downward throw so that the pointed end thereof will engage the ground in the event of the horse starting to move the vehicle to which it is attached.

In operation, when the device is lowered so that the point of the rod will engage the ground, the horse pulling upon the reins and drawing the buggy forward will cause the bar D to move toward a vertical position and which movement will cause the bar N to engage the ground and offer a resistance, drawing back upon the reins and having a tendency to stop the forward movement of the horse, thus affording an effectual hitching apparatus, dispensing with the usual weight which is commonly used for the same purpose.

What I claim to be new is:—

A rein hitching device comprising, in combination with a buggy box, a bar pivotally connected thereto and to which reins are adapted to be fastened, eyes upon said bar, a pointed rod passing through said eyes and having an angled end, a spring upon said rod, a pin carried by the latter and between which and one of said eyes said spring is adapted to bear.

In testimony whereof I hereunto affix my signature in the presence of two witnesses.

WILLIAM W. HILLS.

Witnesses:
　HAROLD B. WHALLEY,
　CLARK E. SULLIVAN.